(12) United States Patent
Kauppinen et al.

(10) Patent No.: US 7,623,840 B2
(45) Date of Patent: *Nov. 24, 2009

(54) METHOD AND SYSTEM FOR HANDLING A NETWORK-IDENTIFIED EMERGENCY SESSION

(75) Inventors: Risto Kauppinen, Helsinki (FI); Miikka Poikselkä, Espoo (FI)

(73) Assignee: Nokia Corporation, Espoo (FI)

( * ) Notice: Subject to any disclaimer, the term of this patent is extended or adjusted under 35 U.S.C. 154(b) by 178 days.

This patent is subject to a terminal disclaimer.

(21) Appl. No.: 11/448,974

(22) Filed: Jun. 8, 2006

(65) Prior Publication Data

US 2007/0097967 A1    May 3, 2007

Related U.S. Application Data

(63) Continuation of application No. 10/475,832, filed as application No. PCT/EP01/04830 on Apr. 27, 2001, now Pat. No. 7,116,967.

(51) Int. Cl.
*H04M 11/04* (2006.01)
*H04B 7/00* (2006.01)

(52) U.S. Cl. .................. 455/404.1; 455/404.2; 455/521

(58) Field of Classification Search .............. 455/404.1, 455/404.2, 521, 445, 417, 421, 450, 414.1, 455/422.1, 456.1, 456.3, 432.1
See application file for complete search history.

(56) References Cited

U.S. PATENT DOCUMENTS 5,493,582 A * 2/1996 Flynn et al. ................. 375/219
5,678,188 A * 10/1997 Hisamura ................... 455/509
5,689,548 A    11/1997 Maupin et al.

(Continued)

FOREIGN PATENT DOCUMENTS

DE    19638112 A1    4/1998

(Continued)

OTHER PUBLICATIONS

Melody Mah et al., "Mobile IP Telephony: Mobile Support of SIP," Proceedings of the International Conference on Computer Communications and Networks, Oct. 11, 1999, pp. 554-559, XP002143545.

(Continued)

*Primary Examiner*—Sonny Trinh
(74) *Attorney, Agent, or Firm*—Mintz, Levin, Cohn, Ferris, Glovsky, and Popeo, P.C.

(57) ABSTRACT

The invention relates to a method and system for establishing an emergency session in a communication system which includes at least one user equipment and one or more network entities involved in establishing an emergency session. When the user equipment initiates a session by sending a message to a network entity indicating an identifier, e.g. the call number or logical name of a called entity, one of said network entities analyses the received identifier. When detecting that the session to be initiated is an emergency session, an information is returned to the user equipment for informing the latter that the initiated session is an emergency session. The user equipment thereupon initiates the execution of an emergency session. Thus, even when the user equipment is unable to detect, by itself, that the intended session is an emergency session, the network will inform the user equipment on the emergency session for ensuring appropriate handling thereof.

27 Claims, 4 Drawing Sheets

U.S. PATENT DOCUMENTS

| | | | |
|---|---|---|---|
| 6,128,481 | A * | 10/2000 | Houde et al. ............. 455/404.2 |
| 6,188,882 | B1 | 2/2001 | Tarkianen et al. |
| 6,233,445 | B1 | 5/2001 | Boltz et al. |
| 6,571,092 | B2 | 5/2003 | Faccin et al. |
| 6,697,628 | B1 * | 2/2004 | Green et al. ............. 455/456.1 |
| 6,775,534 | B2 | 8/2004 | Lindgren et al. |
| 6,927,727 | B2 * | 8/2005 | Cleghorn ............... 342/357.07 |
| 7,130,384 | B2 * | 10/2006 | Goldman et al. .............. 379/37 |
| 2001/0036175 | A1 | 11/2001 | Hurtta |
| 2002/0065081 | A1 | 5/2002 | Barany et al. |
| 2003/0050051 | A1 | 5/2003 | Vilander |
| 2003/0137435 | A1 | 7/2003 | Haddad et al. |
| 2004/0121755 | A1 | 6/2004 | Hurtta |

FOREIGN PATENT DOCUMENTS

| | | |
|---|---|---|
| EP | 1052 866 | 11/2000 |
| WO | 92/16077 | 9/1992 |
| WO | 97/21314 | 6/1997 |
| WO | 99/21380 | 4/1999 |
| WO | WO 02/003718 | 10/2002 |

OTHER PUBLICATIONS

M. Handley et al., "*SIP: Session Initiation Protocol*", RFC 2543, Mar. 1999.

ITU-T H.323, Series H: Audiovisual and Multimedia Systems, "Visual telephone systems and equipment for local area networks which provide a non-guaranteed quality of service", Nov. 1996.

ITU-T H.323, Series H: Audiovisual and Multimedia Systems, "*Packet-based multimedia communications systems*", pp. 1-119, Sep. 1999.

ITU-T H.323, Series H: Audiovisual and Multimedia Systems, "*Packet-based multimedia communications systems*", pp. 1-242, Nov. 2000.

ITU-T H.323, Series H: Audiovisual and Multimedia Systems, "*Packet-based multimedia communications systems, Annex D: Real-time facsimile over H.323 systems*", Sep. 1998.

ITU-T H.323, Series H: Audiovisual and Multimedia Systems, "*Packet-based multimedia communications systems, Annex E: Framework and wire-protocol for multiplexed call signalling transport*", pp. 1-17, May 1999.

ITU-T H.323, Series H: Audiovisual and Multimedia Systems, "*Packet-based multimedia communications systems, Annex F: Simple endpoint types*", pp. 1-14, May 1999.

3G TS 23.228, Technical Specification, "*3$^{rd}$ Generation Partnership Project: Technical Specification Group Services and System Aspects; IP Multimedia (IM) Subsystem—Stage 2*", version 1.7.0, pp. 1-120, 2001-2002.

3GPP TS 23.271, Technical Specification, "*3$^{rd}$ Generation Partnership Project: Technical Specification Group Services and System Aspects; Functional stage 2 description of LCS*", Release 4, version 4.0.0, pp. 1-58, 2001-2002.

3GPP TS 24.008, Technical Specification, "*3$^{rd}$ Generation Partnership Project: Technical Specification Group Core Network; Mobile radio interface layer 3 specification; Core Network Protocols—Stage 3*", version 3.6.0, pp. 1-430, Release 1999.

3GPP TS 25.413, Technical Specification, "*3$^{rd}$ Generation Partnership Project: Technical Specification Group Radio Access Network; UTRAN Iu Interface RANAP Signalling*", version 3.4.0, pp. 1-182, Release 1999.

3G TS 23.171, Technical Specification, "*3$^{rd}$ Generation Partnership Project: Technical Specification Group Services and System Aspects; Functional stage 2 description of location services in UMTS*", version 3.0.0, Release 1999.

3G TS 23.060, Technical Specification, "*3$^{rd}$ Generation Partnership Project: Technical Specification Group Services and System Aspects; General Packet Radio Service (GPRS), Service Description; Stage 2*", version 3.3.0, pp. 1-186, Release 1999.

R. Kauppinen, et al., "*Location-Based Services in Mobile IP Networks*," Specification of U.S. Appl. No. 09/546,208, filed Apr. 10, 2000, pp. 1-25.

* cited by examiner

METHOD AND SYSTEM FOR HANDLING A NETWORK-IDENTIFIED EMERGENCY SESSION

FIELD AND BACKGROUND OF THE INVENTION

The invention generally relates to the connection of emergency sessions such as emergency calls.

Emergency calls shall be supported in IP Multimedia networks (IMS). The UE (User Equipment) may usually be able to indicate in the initial session setup (e.g. in the INVITE message of SIP) that the session is an emergency session.

However, there may be situations where the initial session setup message is just sent with an ordinary number and there is no indication about the emergency. These situations may e.g. occur when a subscriber is roaming in another IMS network.

It is important to identify the intended emergency session as soon as possible, because the network and the UE need to perform some special actions for performing the emergency session.

SUMMARY OF THE INVENTION

The present invention provides method and system for enabling emergency sessions to be established in a reliable manner.

The invention provides a method and/or system as defined in the claims.

This invention discloses means and functions of how the network can detect an emergency session, how the UE can be informed about it and what effects this information has on later session setup.

The invention provides among others a Network-identification of an emergency session initiated by a session initiating entity such as a user equipment (UE) including mobile or stationary stations or terminals, or the like.

Even when the user equipment is unable to detect by itself that the initiated session is an emergency session, it is quickly informed thereon and can then initiate the appropriate steps for establishing the emergency session.

According to a first embodiment of the invention, in order to guarantee resources at the transport level for the emergency call, a response is sent back to the UE immediately after a control means such as P-CSCF has discovered that the session is an emergency session. When the UE receives such a response it will perform a normal emergency session procedure, e.g. as defined in 3GPP specifications. To execute a normal emergency session, the UE will e.g. obtain or query location information and send it in the INVITE message and also the UE will activate an emergency PDP context for the session.

The invention enables to identify the session to be an emergency session as soon as possible so that the network and the UE can perform the necessary special actions for the emergency session as quickly as possible.

In one of the alternative implementations of the invention, the control entity such as P-CSCF does not respond immediately to UE when it has received an INVITE message from the UE but waits for the reception of a message, e.g. 183 Session Progress, from an emergency center or an intermediate network entity, and adds to that message the emergency information.

The information about the emergency call is not delayed at all, and the call establishment is continued in the conventional or any other manner such as with the 183 Session Progress message.

Sending an INVITE message takes remarkable radio resources and it is not preferable to send multiple INVITE messages. Actually there is no delay in session establishment, since UE has not yet started creating secondary PDP Context before UE receives the SDP message. This means that the indication can be included with high priority for the user plane. If no emergency centre is indicated, a default emergency center may be chosen.

This invention concerns a situation, in which PDP context activation can not or will not be performed at first when initiating a session for any reason, but a message such as an INVITE message is sent first from the UE to the CSCF.

Further details, aspects and advantages of the invention will become apparent from the following reference to specific embodiments and the attached drawings.

DESCRIPTION OF PREFERRED EMBODIMENTS OF THE INVENTION

This invention discloses solutions to several problems such as:

- The UE is able to activate an emergency PDP context after it has been informed about the session characteristics. This is important to get high priority for the PDP context in the GPRS (General Packet Radio Service) and RAN (Radio Access Network).
- The UE sends location information after it is being informed about the session characteristics (it is assumed that location information is not sent in every INVITE message). The location information is used for selecting the most suitable Emergency Centre (EC).

Figure 1:
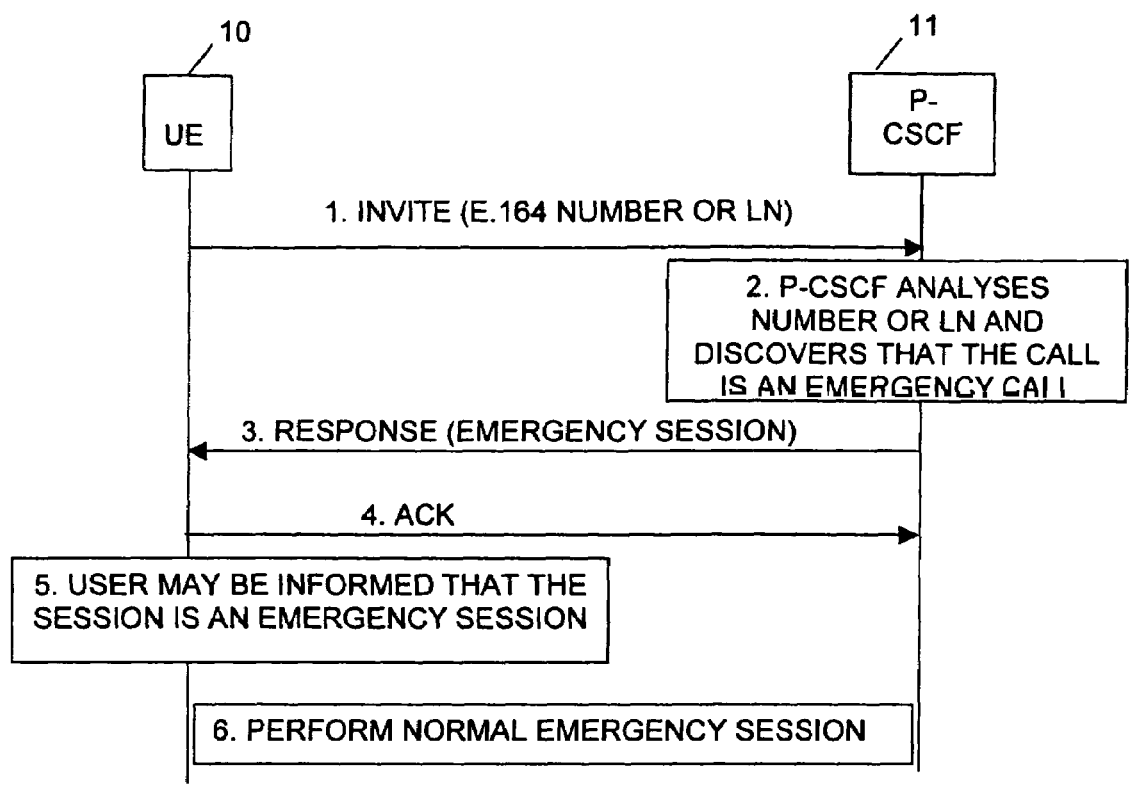
FIG. 1 shows a first embodiment of a method and system in accordance with the present invention.

FIG. 1 shows an embodiment of the invention which includes a call originating element, i.e. a session initiating element, such as a mobile station (UE) 10, and a network which comprises a serving network element such as a Serving GPRS Support Node (SGSN), and a further control element such as a Call State Control Function (CSCF) or Proxy Call State Control Function (P-CSCF) 11. The further network elements necessary for completing an IP multimedia session such as a terminating element, a gateway node if needed, a subscriber information register such as a home location register (HLR) or home subscriber server (HSS), etc. are known to the skilled man and are therefore neither shown nor described in more detail. Generally, a MSC (Mobile Switching Centre, not shown) may return to UE a Call Proceedings message which contains a Priority information field defining also EC (Emergency Centre).

In all embodiments described above or below, the UE 1 may be equipped with a USIM (User Services Identity Module).

Figure 2:
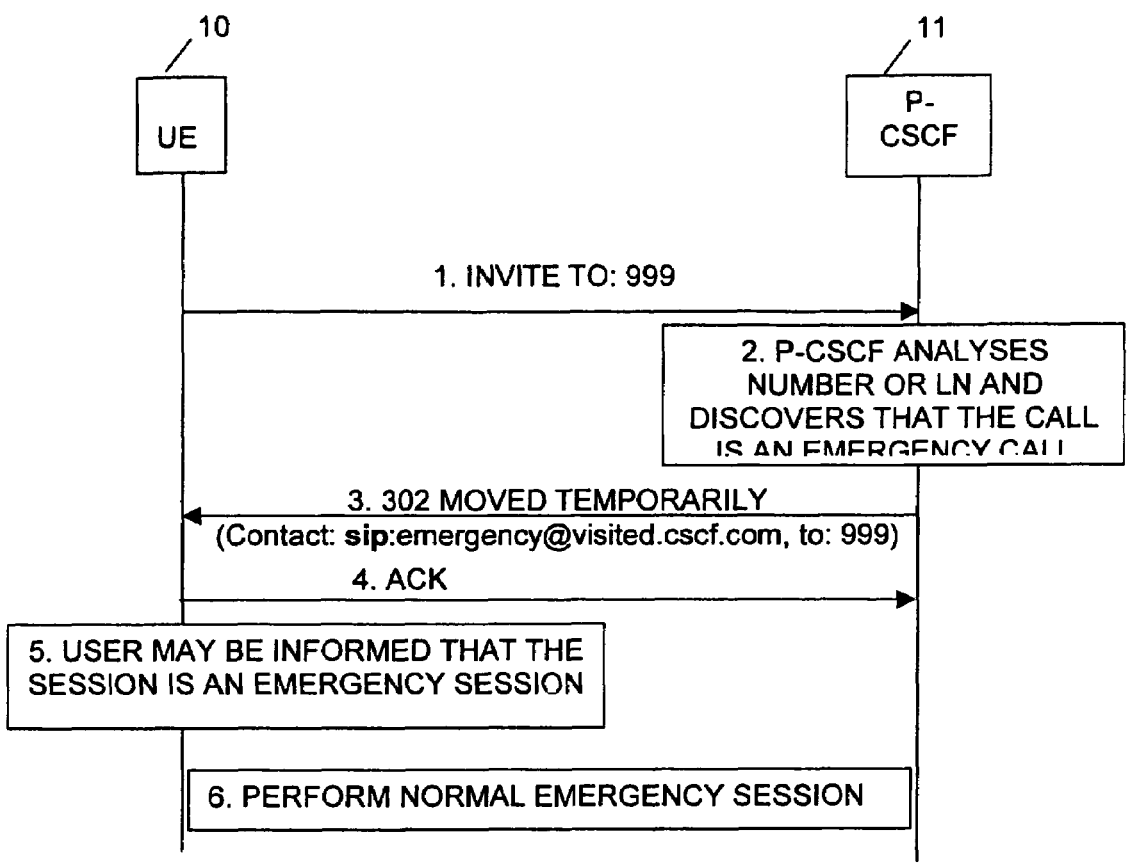
FIG. 2 shows a second embodiment of a method and system in accordance with the present invention.
Figure 3:
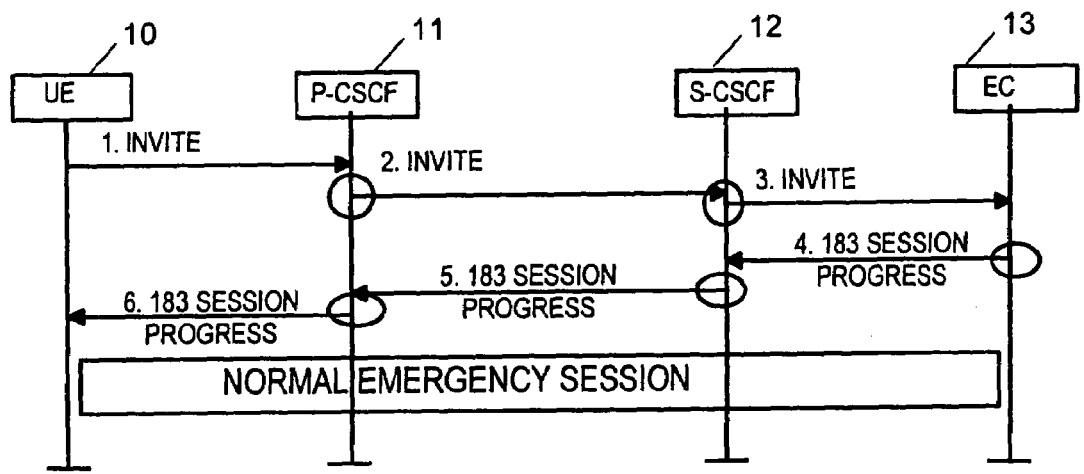
FIG. 3 illustrates a third embodiment of a method and system in accordance with the present invention.

The embodiments shown in FIGS. 1, 2, and 3 relate to a Network-identified emergency session.

A solution to guarantee resources at the transport level to perform the emergency call is to respond back to the UE 10 immediately after a network entity, e.g. a control means such as P-CSCF 11, has discovered that the session is an emergency session. When the UE 10 receives the response, i.e. is informed, by the network, on the initiated session being an emergency session, it will perform normal emergency session procedure, e.g. as defined in 3GPP specifications.

FIG. 1 shows the solution at a general level.

In step 1, the UE 10 sends a session initiation message, e.g. an INVITE message of SIP (Session Initiation Protocol), which indicatess an identifier, e.g. the E.164 number or LN (logical name), of the called entity, to the P-CSCF 11.

In a step 2, the P-CSCF 11 analyses the number or LN. When detecting that a normal session is to initiated, a normal connection procedure is continued. When, however, the P-CSCF 11 discovers that the call is emergency call, steps 3 to 6 shown in FIG. 1 are performed.

In step 3, a response is sent to the UE 10 indicating that the session is an emergency session.

Step 4: The UE 10 returns an acknowledgement message ACK to the P-CSCF 11.

In an optional step 5, the UE 10 may inform the user that the session is emergency session, e.g. by displaying an appropriate message on a display of the UE 10.

Then, a normal emergency session is executed (performed) as indicated by step 6. The execution of a normal emergency session means that the UE 10 will e.g. obtain location information and send it in the INVITE message and also that the UE 10 will activate an emergency PDP context for the session.

The response message at step 3 can be a new message, or an existing SIP message or other known message can be used. The information in the response message may be a new parameter in SIP protocol, but an existing parameter may also be used.

FIG. 2 shows a solution in which, in step 3, a SIP 302 message "Moved Temporarily" is used as response. The parameter value in the 302 message indicates that the session is an emergency session. The parameter may e.g. be "Contact: sip:emergency@visited.cscf.com". This value can e.g. be used in SIP URI when sending a new INVITE message to P-CSCF 11, or the UE 10 just generates a new INVITE message with the indication of an emergency session. Another alternative can be to use the SIP NOTIFY method.

Apart from the above discusion, the embodiment shown in FIG. 2 has the same structure and functioning as the one of FIG. 1.

FIG. 3 illustrates another embodiment of the invention. In addition to the UE 10 and the P-CSCF 11, a Serving CSCF (S-CSCF) 12 and an Emergency Centre (EC) 13 are shown. The embodiment according to FIG. 3 provides an alternative functioning as compared to the embodiments of FIGS. 1 and 2.

In order to achieve a very fast session establishment the P-CSCF 11 does not respond back to the UE 10 immediately after P-CSCF 11 has discovered that the session is an emergency session. On the contrary it continues session establishment and optionally, if possible, the P-CSCF 11 adds an indication of emergency session to the messages generated by P-CSCF 11 for ensuring high priority treatment of the messages.

The details of the procedure are shown in FIG. 3. Taking account of the nature of emergency session it is highly desirable not to add any additional delay also in case of abnormal situations to session establishment. By using the alternative of FIG. 3, it is possible to avoid the transfer of another INVITE message over the air interface, which is probably the largest and slowest message and thus very time-consuming.

The response message (in SIP, preferably a message "183 Progress") to the UE 10 preferably includes an indication of emergency session. This allows to activate an emergency PDP context for the session.

If there should not exist location information in S-CSCF 12 (or the relevant server) to select an emergency center 13, the S-CSCF 12 (or relevant server) will select an emergency center 13 without location information of the user (e.g. it selects a default emergency center, nearest emergency center or it may use some other technique to select the emergency center e.g. based on the address of P-CSCF 11.

As shown in FIG. 3, in step 1, the UE 10 initiates a session establishment and sends a session setup message, e.g. an INVITE message, to the P-CSCF 11. The P-CSCF 11 analyses the number or logical name (LN) of the called party/entity indicated in the session setup message, and discovers that the call is an emergency call. The P-CSCF 11 may add an indication of emergency session to the INVITE message (it is also possible that other elements add this indication of emergency session to the INVITE message).

In step 2, the INVITE message is forwarded to the S-CSCF 12.

In Step 3, the S-CSCF 12 selects an emergency center (EC) 13 and forwards the INVITE message to the EC 13.

Step 4: The EC 13 responds to the INVITE request by returning a response such as SIP 183 "Session Progress" to the S-CSCF 12. The subset of the media flows shown in steps 4 to 6 indicates that messages are returned back to originating endpoints proposing an EC 13 for providing support, or requesting the emergency session.

Step 5: The S-CSCF 12 forwards the response such as SIP 183 "Session Progress" back to the P-CSCF 11.

Step 6: The P-CSCF 11 forwards the response such as SIP 183 "Session Progress" back to the UE 10. The response includes the indication of emergency session. The UE 10 thus learns that this session is an emergency session and can act properly.

The circles and ovals shown in FIG. 3 mean "Emergency call detected, Possibility to add an emergency indication".

Figure 4:
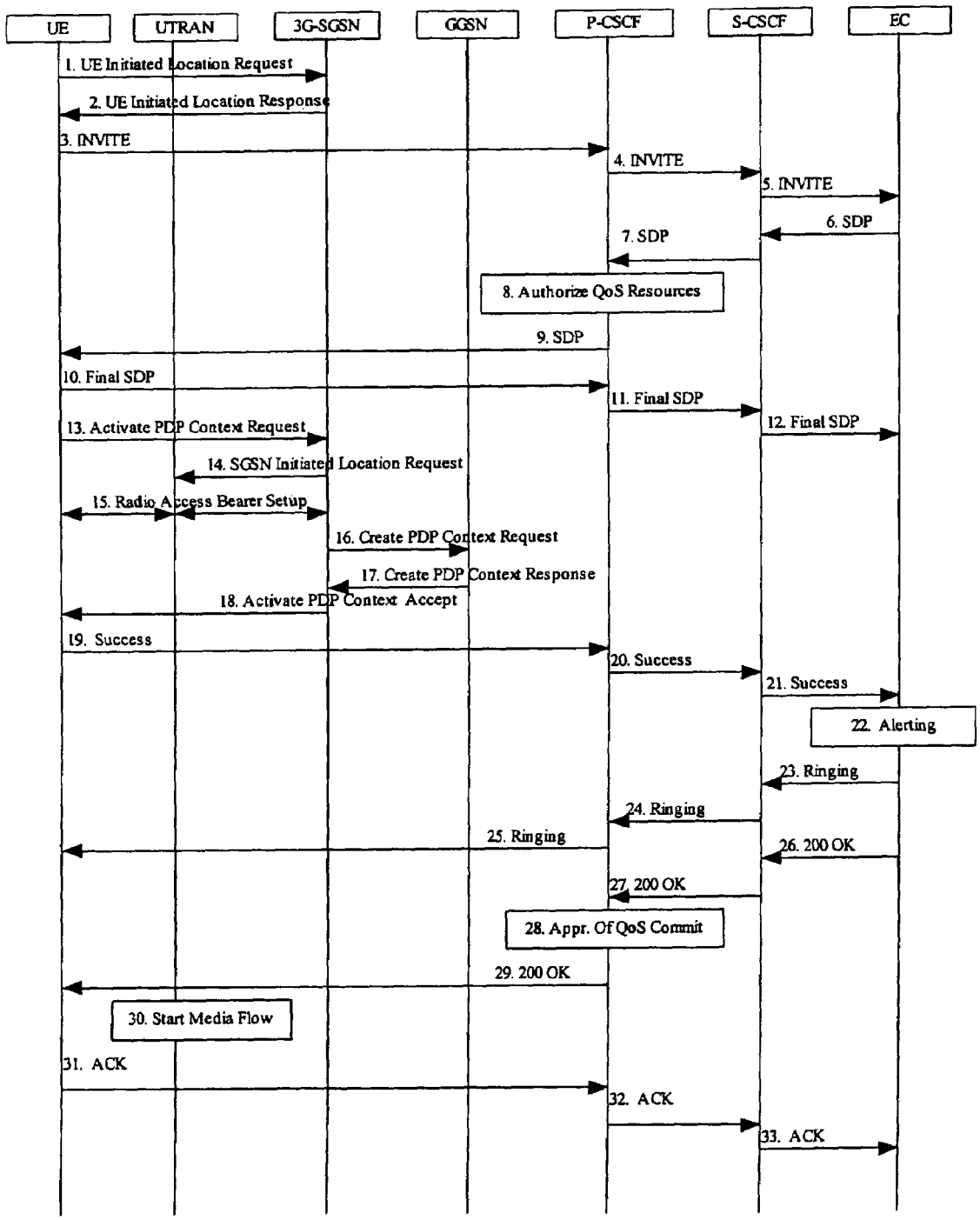
FIG. 4 shows an implementation for emergency session processing in a normal case.

FIG. 4 presents a proposal for normal emergency session establishment for the case where the UE has USIM. It is assumed that the UE has activated a signalling PDP context to the GGSN in the visited PLMN.

In the following, the steps shown in FIG. 4 are described in more detail, referring to the step numbering of FIG. 4.

1. UE may request SAI (Service Area Identity) from SGSN.
2. SGSN sends response message to UE.
3. UE sends the SIP INVITE request, containing an initial SDP, to a P-CSCF determined via the CSCF discovery mechanism. Information about emergency call is sent in the INVITE message. UE includes the location information in the INVITE message.
4. P-CSCF detects that the call is an emergency call using the information in the INVITE message e.g. by analysing the number or name requested. P-CSCF selects a S-CSCF in the visited network and forwards the SIP INVITE request including the information about emergency call to S-CSCF.
5. S-CSCF uses the location information to select an appropriate EC. S-CSCF forwards the request to EC.
6. The media stream capabilities of the destination are returned along the signaling path.
7. S-CSCF forwards the message containing the destination SDP cababilities to P-CSCF.

8. P-CSCF authorizes the resources necessary for this session.
9. P-CSCF forwards the SDP message to the originating endpoint.
10. UE decides the final set of media streams for this session, and sends the Final SDP to P-CSCF.
11. P-CSCF forwards the final SDP to S-CSCF.
12. S-CSCF forwards this message to EC.
13. Activate PDP Context Request. The UE activates a PDP context for the emergency session by sending the Activate Secondary PDP Context Request message to the SGSN. The UE indicates that the PDP context is used for an emergency session. For the PDP context, the Allocation/Retention Priority shall be at once set to the high value.
14. The SGSN, when recognising that the PDP context is for an emergency session, may itself request location information from SRNC, in order to receive updated or more accurate location information regarding the UE. SGSN thereafter sends a location report to Gateway Mobile Location services Centre (GMLC) as specified in TS 23.271, and the EC may obtain this location information from GMLC.
15. Radio Access Bearer Setup
16. Create PDP Context Request
17. Create PDP Context Response
18. Activate PDP Context Accept
19. UE sends the "Resource Reservation Successful" message to the terminating endpoint, via the signaling path established by the INVITE message.
20. P-CSCF forwards this message to S-CSCF.
21. S-CSCF forwards this message to EC.
22. Resources are reserved successfully.
23. EC sends information about alerting to S-CSCF.
24. S-CSCF forwards the Ringing message to P-CSCF.
25. P-CSCF forwards this message to UE.
26. EC answers the call and sends final 200 OK message to S-CSCF.
27. S-CSCF forwards final 200 OK message to P-CSCF.
28. P-CSCF indicates the resources reserved for this session should now be committed.
29. P-CSCF forwards final 200 OK message to UE.
30. UE starts the media flow for this session.
31. The calling party responds to the 200-OK final response with a SIP ACK message which is sent to P-CSCF.
32. P-CSCF forwards the SIP ACK message to S-CSCF
33. S-CSCF forwards the ACK message to EC.

Although the invention has been described above with reference to specific embodiments, the scope of protection of the invention intends to cover all modifications, omissions, additions and amendments of the disclosed features as well.

The teaching according to the invention is preferably implemented in an All-IP Network but may also be employed in networks of various other types, i.e. in IM, GPRS and UMTS domains.

The invention claimed is:

1. An apparatus, comprising:
a receiver configured to receive a message from a user equipment to initiate a session, said message indicating an identifier of a called entity;
an analyzer configured to analyze the identifier and to detect a request for an initiation of an emergency session; and
a sender configured to send information to the user equipment that the session to be initiated is an emergency session,
configured to
inform an emergency center or another apparatus that an emergency session is to be established when the session to be initiated is an emergency session, and
to send the information to the user equipment or another apparatus only after receipt of a response from the emergency center.

2. The apparatus according to claim 1, wherein the receiver is configured to determine location information of the user equipment, and wherein the sender is configured to send the location information to one of other network elements.

3. The apparatus according to claim 1, wherein the apparatus is configured to initiate an emergency packet data protocol context for the emergency session.

4. The apparatus according to claim 1, wherein the information sent by the sender comprises a parameter indicating an address of a network entity to be addressed for establishing the emergency session.

5. The apparatus according to claim 1, wherein the apparatus comprises a call state control function.

6. An apparatus, comprising:
a receiver configured to receive a message from a user equipment containing an identifier of a called entity for initiating a session;
an analyzer configured to analyze the identifier, and to detect that the session to be initiated is an emergency session;
a sender configured to send information to the user equipment for informing the user equipment that the initiated session is an emergency session,
wherein the receiver is further configured to receive a re-initiation message from the user equipment, the re-initiation message comprising the information.

7. The apparatus according to claim 6, wherein the apparatus comprises a proxy-call state control function.

8. An apparatus, comprising:
a sender configured to send a message to a call controlling network element, said message indicating an identifier of a called entity;
a receiver configured to receive, from the call controlling network element, information indicating that an emergency session is being initiated, wherein the apparatus is configured to re-initiate the session by sending a message to the call controlling network element, the message comprising the information.

9. The apparatus as recited in claim 8, configured to at least one of:
initiate the emergency session using a packet data protocol context,
be a user equipment.

10. The apparatus according to claim 8, wherein the information in the message sent to the network element comprises a parameter indicating an address of a network entity to be addressed for establishing the emergency session.

11. An apparatus, comprising:
a sender configured to send a message to a network entity to initiate a session, the message indicating an identifier of a called entity;
a receiver configured to receive, when the session to be initiated is an emergency session, an information informing the apparatus that the initiated session is an emergency session; and
an initiator configured to initiate execution of an emergency session upon receipt of said information.

12. The apparatus according to claim 11, wherein the initiator further comprises an obtainer configured to obtain location information of the apparatus, and to send the location information to a network entity.

13. The apparatus according to claim 11, wherein the transmitter is configured to send the message including a parameter indicating an address of a network entity to be addressed for establishing an emergency session.

14. The apparatus according to claim 11, wherein the sender is configured to send an acknowledgement message to a call controlling network element in response to the receiver receiving the information informing the apparatus that the initiated session is an emergency session.

15. The apparatus according to claim 11, wherein the initiator is configured to execute a new emergency session upon receipt of the information, wherein the new emergency session is configured to provide additional network resources for an emergency call.

16. An apparatus, comprising:
a sender configured to send a message to a network entity for initiating a session, the message indicating an identifier of a call entity;
a receiver configured to receive, when the session to be initiated is an emergency session, information informing the apparatus that the initiated session is the emergency session; and
a sender configured to send an acknowledgement message to a call controlling network element in response to receiving the information informing the apparatus that the initiated session is an emergency session.

17. The apparatus according to claim 16, wherein the emergency session is initiated using a packet data protocol context.

18. A method, comprising:
sending a message to a call controlling network element, said message indicating an identifier of a called entity;
receiving, from the call controlling network element, information indicating that an emergency session is being initiated; and
re-initiating the session by sending a message to the call controlling network element, the message comprising the information.

19. The method as recited in claim 18, wherein the emergency session is initiated using a packet data protocol context.

20. The method according to claim 18, wherein the information in the message sent to the network element comprises a parameter indicating an address of a network entity to be addressed for establishing the emergency session.

21. A method, comprising:
sending a message to a network entity to initiate a session, the message indicating an identifier of a called entity;
receiving, when the session to be initiated is an emergency session, an information informing the user equipment that the initiated session is an emergency session; and
initiating execution of an emergency session upon receipt of said information.

22. The method according to claim 21, further comprising:
obtaining location information of the user equipment; and
sending the location information to a network entity.

23. The method according to claim 21, wherein said sending comprises sending the message comprising a parameter indicating an address of a network entity to be addressed for establishing an emergency session.

24. The method according to claim 21, further comprising:
sending an acknowledgement message to a call controlling network element in response to receiving the information regarding the initiated session is an emergency session.

25. The method according to in claim 21, further comprising:
executing a new emergency session upon receipt of the information, wherein the new emergency session is configured to provide additional network resources for an emergency call.

26. A method, comprising:
sending a message to a network entity for initiating a session, the message indicating an identifier of a call entity;
receiving, when the session to be initiated is an emergency session, information informing a user equipment that the initiated session is the emergency session; and
sending an acknowledgement message to a call controlling network element in response to receiving the information informing the user equipment that the initiated session is an emergency session.

27. The method according to claim 26, wherein the emergency session is initiated using a packet data protocol context.

* * * * *

UNITED STATES PATENT AND TRADEMARK OFFICE
CERTIFICATE OF CORRECTION

PATENT NO. : 7,623,840 B2  Page 1 of 1
APPLICATION NO. : 11/448974
DATED : November 24, 2009
INVENTOR(S) : Kauppinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,840 B2 | Page 1 of 1 |
| APPLICATION NO. | : 11/448974 | |
| DATED | : November 24, 2009 | |
| INVENTOR(S) | : Risto Kauppinen et al. | |

It is certified that error appears in the above-identified patent and that said Letters Patent is hereby corrected as shown below:

At Column 7, Claim 16, line number 20, should read -- called entity --

At Column 8, Claim 26, line number 32, should read -- called entity --

Signed and Sealed this
Twelfth Day of June, 2012

David J. Kappos
*Director of the United States Patent and Trademark Office*